United States Patent
Ashley et al.

(10) Patent No.: US 8,046,808 B2
(45) Date of Patent: Oct. 25, 2011

(54) COMMUNICATION OF TV-ANYTIME CRIDS

(75) Inventors: Alexis Stephen Richard Ashley, Redhill (GB); Andrew James Hickman, London (GB); Octavius John Morris, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 857 days.

(21) Appl. No.: 11/135,166

(22) Filed: May 23, 2005

(65) Prior Publication Data

US 2005/0238062 A1    Oct. 27, 2005

Related U.S. Application Data

(63) Continuation of application No. 10/502,157, filed as application No. PCT/IB03/000076 on Jan. 14, 2003.

(30) Foreign Application Priority Data

Jan. 24, 2002    (GB) .................................. 0201594.9

(51) Int. Cl.
*H04N 7/173* (2006.01)

(52) U.S. Cl. ............ 725/86; 725/91; 725/100; 725/114; 725/126; 725/131; 725/136; 725/138; 725/139; 725/144; 725/151; 370/464; 370/537

(58) Field of Classification Search ................. 725/86, 725/91, 100, 114, 126, 131, 136, 138, 139, 725/144, 151; 370/464, 537
See application file for complete search history.

(56) References Cited

U.S. PATENT DOCUMENTS

| | | | | |
|---|---|---|---|---|
| 5,929,849 | A * | 7/1999 | Kikinis | 725/113 |
| 6,915,528 | B1 * | 7/2005 | McKenna, Jr. | 725/37 |
| 7,188,353 | B1 * | 3/2007 | Crinon | 725/32 |
| 7,200,857 | B1 * | 4/2007 | Rodriguez et al. | 725/87 |
| 2003/0002850 | A1 * | 1/2003 | Shinohara | 386/46 |
| 2003/0018970 | A1 * | 1/2003 | McKenna, Jr. | 725/37 |
| 2003/0093790 | A1 * | 5/2003 | Logan et al. | 725/38 |
| 2003/0110490 | A1 * | 6/2003 | Dew et al. | 725/37 |
| 2003/0115601 | A1 * | 6/2003 | Palazzo et al. | 725/42 |

OTHER PUBLICATIONS

Semandex Netlink Content Distribution Network: Enhanced "Engineering Changes" Application, pp. 1-8.
Tv-Anytime: Content Referencing Specification Series: S-4.
Tv-Anytime: Content Referencing Requirements Series: R-4.

* cited by examiner

*Primary Examiner* — Pankaj Kumar
*Assistant Examiner* — Charles N Hicks

(57) ABSTRACT

A method of creating an audio-video stream comprises multiplexing a video component, an audio component, a content reference identifier, and a semantic data packet containing information on the relationship between the video component and the content reference identifier. Apparatus for receiving the audio-video stream, and apparatus for transmitting the audio/video stream are disclosed.

23 Claims, 3 Drawing Sheets

Figure 1:
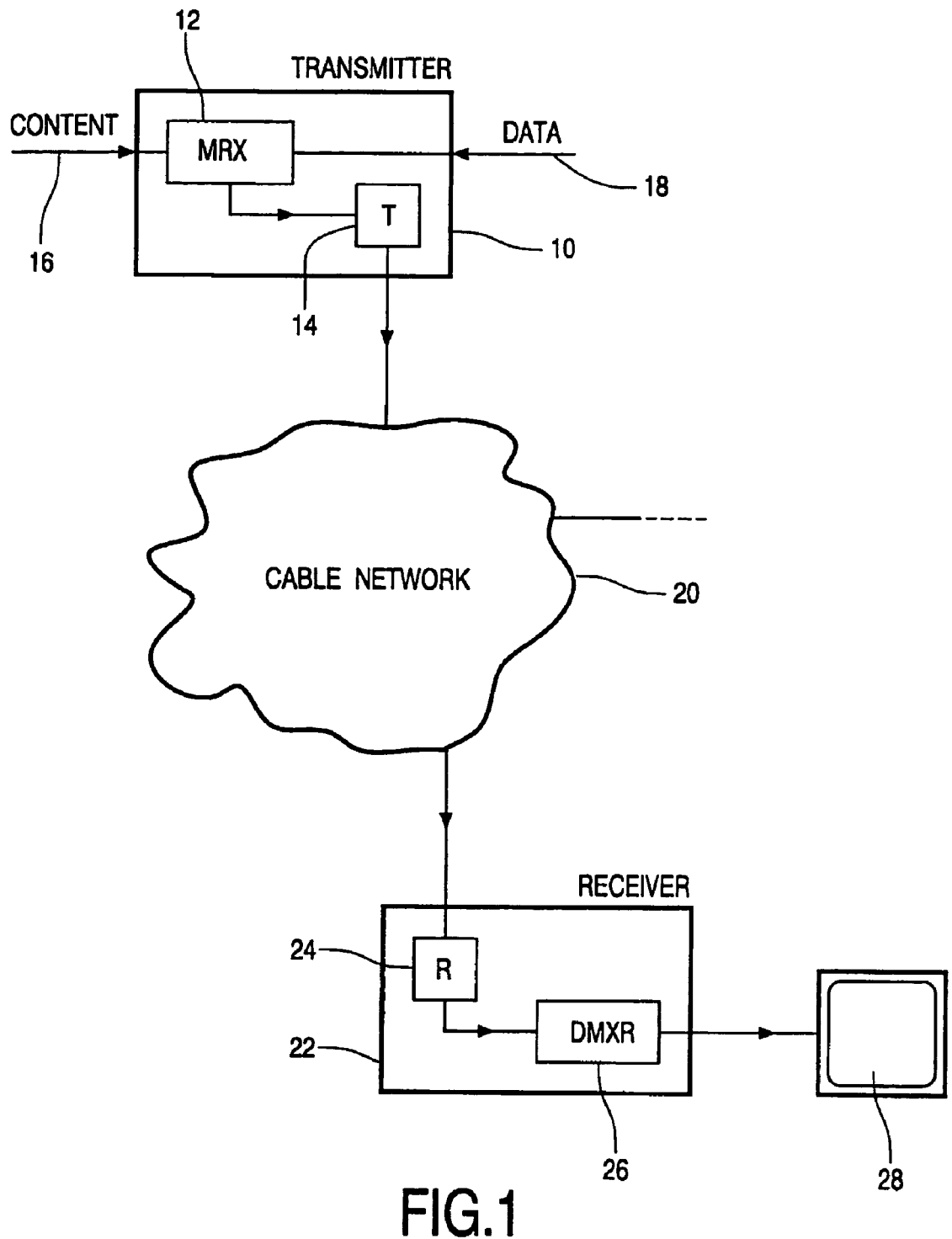

| Type | Group | Relationship | Example usage |
|---|---|---|---|
| Trailer | no | The current A/V content is a trailer for the programme identifying the CRID | Record the film being trailered |
| Trailer | yes | The current A/V content is a trailer for the group of programmes identified by the CRID | Record a forthcoming series being trailered |
| Sibbling | no | The programme identified by the CRID is a sibbling of the current A/V content | Record the next episode in a series whilst watching an earlier episode |
| Alternative | no | The CRID identifies an alternative version of a programme with the same editorial content of the current A/V stream | Whilst watching a programme the user discovers that a high definition version is available elsewhere |
| Parent | yes | A group of programmes identified by the CRID contain the programme which is the current A/V content | Record an entire series, whilst watching one of the episodes |
| Recommendation | no | The broadcaster considers there to be a relationship between the current A/V content and the programme identified by the CRID | Record a programme which the broadcaster recommends because of what the user is watching |
| Recommendation | yes | The broadcaster considers there to be a relationship between the current A/V content and the group of programmes identified by the CRID | Record a series which the broadcaster recommends because of what the user is watching |
| Advert | no | A product or service featured in the current A/V content is being advertised elsewhere. The CRID identifies the A/V content of that advert | The user is watching a film containing a desirable product. If the user indicates interest in that product an advert is captured providing further information |
| Other | yes/no | To be defined | |

FIG.4

COMMUNICATION OF TV-ANYTIME CRIDS

This is a Continuation of application Ser. No. 10/502,157, filed Jul. 20, 2004, which is a 35 U.S.C. §371 of PCT/IB03/000076 filed Jan. 14, 2003, which was first foreign-filed as United Kingdom application 020 1594.9 on Jan. 24, 2002.

This invention relates to a method of creating an audio/video stream, apparatus for transmitting an audio/video stream, apparatus for receiving an audio/video stream and to the audio/video stream itself.

Traditionally, the small number of television channels and single method of delivery (wireless broadcast) meant that an end user could easily track the programme schedules to monitor the content delivered to them. However, following the introduction of digital television and the Internet, there has been a rapid increase of the number of channels (now numbering into the hundreds) and content available to an end user. Equally, the number of delivery methods has also increased to include broadcast via fibre optic cable and the old copper wire telephone network. An end user is hard pressed to follow even a small proportion of the content available, with the resulting reduction in enjoyment of the available services.

Various interested parties are working on a number of methods of addressing this problem. One such group is the TV-Anytime Forum (www.tv-anytime.org) which is developing a system for searching, selecting, locating and acquiring content wherever (i.e. traditional broadcasting, Internet-based etc.) or whenever (i.e. scheduled or instantly accessible) it is made available. In order to realise this concept, the Forum has identified three distinct technical areas with requirements for standardisation, being metadata, content referencing and rights management. These three areas are considered to span the minimum basic features needed to implement a workable end-to-end TV-Anytime system, in which consumers can search for content, make selections, and acquire content for viewing or capture.

The document TV038r2 (7 Apr. 2000) "Requirements Series: R4 on Content Referencing Requirements (Normative)" produced by the TV Anytime Forum refers to various aspects of the content referencing. This document is incorporated by reference herein. The TV Anytime Forum has specified a Content Reference Identifier (CRID) that identifies a specific content item, but does not specify where that content item can be found. However there are problems associated with the content reference identifier and its communication to the end user in a way that is useful for that end user.

It is therefore an object of the invention to improve the communication of the content reference identifier.

According to a first aspect of the present invention, there is provided a method of creating an audio/video stream comprising multiplexing a video component, an audio component, a content reference identifier, and a semantic data packet containing information on the relationship between the video component and the content reference identifier.

According to a second aspect of the present invention, there is provided apparatus for transmitting an audio/video stream comprising a multiplexer for multiplexing a video component, an audio component, a content reference identifier, and a semantic data packet containing information on the relationship between the video component and the content reference identifier, and transmitting means for transmitting the resulting audio/video stream.

According to a third aspect of the present invention, there is provided apparatus for receiving an audio/video stream comprising receiving means for receiving an audio/video stream comprising a video component, an audio component, a content reference identifier, and a semantic data packet containing information on the relationship between the video component and the content reference identifier and a demultiplexer for demultiplexing said audio/video stream.

According to a fourth aspect of the present invention, there is provided an audio/video stream comprising a video component, an audio component, a content reference identifier, and a semantic data packet containing information on the relationship between the video component and the content reference identifier.

Owing to the invention, the end user is supplied with the content reference identifiers in an easily accessible manner and including semantic information on the relationship between the video component and the content reference identifier. By categorising the various ways in which a content reference identifier can be related to the video component and by labelling the semantics of these relationships, the apparatus for receiving an audio/video stream is able to process the identifier sensibly and is able to construct appropriate user interfaces accordingly.

Advantageously, the semantic data packet includes information on whether the content reference identifier is a current or a linking content referencing identifier. The audio/video stream may contain a second content reference identifier, and the semantic data packet contains information on both content reference identifiers. Preferably, the semantic data packet includes information as to whether the or each content reference identifier is time critical.

The apparatus for transmitting the audio/video stream transmits said audio/video stream via either a wireless connection (such as a radio link), or via a wired connection (such as a fibre optic cable). The apparatus for receiving the audio/video stream is preferably a digital television receiver.

The audio/video stream can be transmitted by any suitable uni-directional delivery method, including traditional broadcast, Internet multicast and one to one file server delivery.

Embodiments of the invention will now be described, by way of example only, with reference to the accompanying drawings, in which:—

Figure 2:
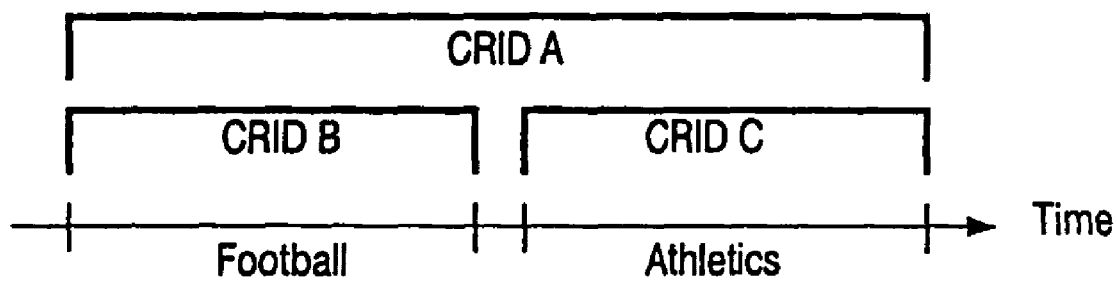
Figure 3:
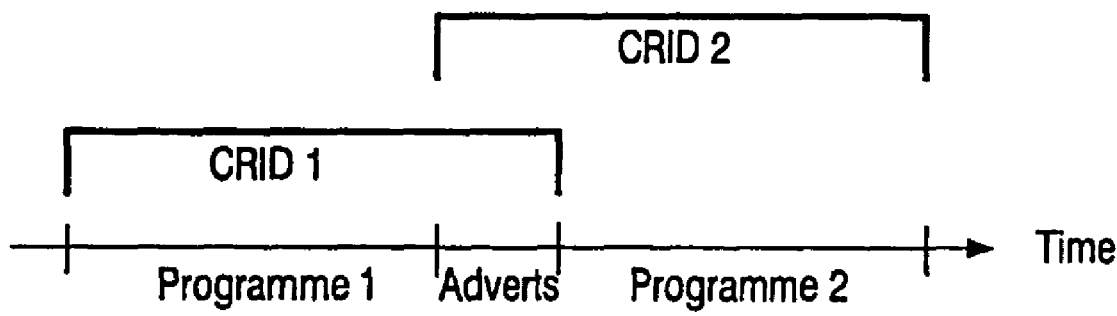

FIG. 1 is a schematic diagram of apparatus for transmitting an audio/video stream via a cable network to apparatus for receiving an audio/video stream, FIG. 2 is a schematic diagram of an audio/video stream, FIG. 3 is a schematic diagram of a second audio/video stream, and FIG. 4 is a table of linking content reference identifiers.

In FIG. 1, the apparatus for transmitting the audio/video stream is a transmitter 10 that comprises a multiplexer 12 and transmitting means 14. The multiplexer 12 is for multiplexing a video component, an audio component, a content reference identifier and a semantic data packet into an audio/video stream for transmitting via a suitable delivery network.

The video component and the audio component are shown as supplied to the multiplexer 12 as a single content stream 16, which may be retrieved from a database or be generated in real time from, for example, a sporting event. Equally, the multiplexer 12 could receive the video and audio components separately. The content reference identifier and the semantic data packet are likewise supplied to the multiplexer 12 as a single data stream 18, although as for the video and audio components, they could be supplied separately.

The semantic data packet contains information on the relationship between the video component and the content reference identifier. This is discussed in more detail below. The content reference identifier is unique to content being supplied, and functions as an identifying label for that content. The content reference identifier is generated according to a predefined rubric controlled by the content provider.

The audio/video stream comprising the video component, the audio component, the content reference identifier, and the semantic data packet is transmitted by the transmitting means 14 via a cable network 20 to receivers connected to that network 20. Equally, the transmitting means 14 could transmit the stream via a wireless connection, such as a standard modulated television signal or satellite broadcast.

One such receiver 22, in the form of a digital television receiver (commonly referred to as a set top box) is shown connected to the cable network 20. This apparatus for receiving an audio/video stream comprises receiving means 24 for receiving the audio/video stream and a demultiplexer 26 for demultiplexing the audio/video stream. Additionally, the receiver is provided with standard components such as a CPU, cache memory, main memory etc., not shown for reasons of clarity.

The receiving means 24 of the receiver 22 receives the audio/video stream comprising a video component, an audio component, a content reference identifier and a semantic data packet and supplies this stream to the demultiplexer 26 which splits the stream into its constituent parts. In normal operation, the demultiplexer 26 supplies the video component to a display device 28, which typically will have audio functionality to additionally receive the audio component.

An end user will therefore see displayed on the display device 28 the video stream for the channel that they have selected. The cache memory of the receiver 22 will store the content reference identifier and the semantic data packet. Using a suitable user interface, such as a remote control, a user can access functions of the receiver 22, usually through an on screen menu system.

In its simplest use, the content reference identifier will refer directly to the video stream in which it is embedded, simply being the label of that current content. This current content reference identifier can be used for such things as obtaining enhanced information about the current programme via the user interface. A user can select from an on screen menu an option to obtain information on the current programme. Once selected, the receiver 22 retrieves the content reference identifier from its cache memory and uses this to obtain further information on the programme, which may be retrieved from an associated website, or from data delivered by the transmitter 10.

However, in many situations the content reference identifier will not relate directly to the content being delivered, or there will be more than one content reference identifier in the audio/video stream. In these situations, the functionality of the receiver 22 is greatly enhanced by it being aware of the relationship between the video component of the audio/video stream and the content reference identifier or identifiers. This is achieved by the presence of the semantic data packet in the audio/video stream, which contains information on this relationship. The CPU is programmed to interpret the semantic data packet and to adjust the operation of the receiver 22 accordingly.

For example, if a trailer for a forthcoming programme is being shown, then the content reference identifier embedded in the stream will not be for the trailer, but will be for the actual programme being trailered. The semantic data packet will contain information that indicates to the receiver 22 that the content being delivered is a trailer for a future programme and that the content reference identifier is for the future programme. If the user of the receiver 22 then selects a record function during the broadcast of the trailer, the receiver will not record the present video and audio components of the audio/video stream. Instead, the receiver 22 will transfer the content reference identifier associated with the stream from its cache to a buffer in the main memory. The receiver 22 can capture the content of the selected programme according to the methodology of the TV Anytime content referencing standard.

A number of complicated situations arise when the audio/video stream contains a second content identifier. In this instance, the semantic data packet contains information on both content reference identifiers. Should there be more than two identifiers, then the semantic data packet contains information on all of the content reference identifiers and on their relationships to the video component of the audio/video stream.

For example, while a film is being broadcast, the audio/video stream will include a content reference identifier for the film itself, but may also include an identifier for a "making of . . . " programme that is to be broadcast soon and may also contain an identifier for the sequel to the film. The semantic data packet will contain categorising information on the different content reference identifiers, such that the receiver 22 will be able to tell which identifier is which and to render this information in a manner that is useful to the end user. Again taking the example of recording, if the end user selects the record function, they will be shown details of the film and of the different programmes linked to the film and then be able to choose the content that they are actually wish to record.

If the programme being broadcast has a hierarchical structure whereby the overall programme has smaller constituent parts, in addition to the content reference identifier for the overall programme, the sub-divisions will be allocated individual identifiers to allow them to be recorded in isolation. An example of this is a sports programme composed of different sporting events, illustrated in FIG. 2. The receiver 22 is able to distinguish between the different hierarchical type of identifier based upon the content of the associated semantic data packet, and therefore to handle the data differently and to present it to the user in a suitable fashion. Similar situations arise from programmes of "omnibus" and "magazine" format which will have content reference identifiers for the overall programme and for the different units within the programme.

It is also possible that the audio/video stream will contain two different content reference identifiers for two programmes that follow each other. Two programmes adjoining each other may share some common content that the broadcaster considers useful for the receiver 22 to capture if either of the programmes is recorded, illustrated in FIG. 3. This may be, for example, advertisements, or joining sections. Again this information is contained in the semantic data packet for processing by the receiver 22.

A combination of the above two scenarios (e.g. two magazine programmes adjoining each other) could lead to four or more identifier content reference identifiers being transmitted simultaneously. The receiver 22 is informed of the type and relationship of each identifier via the semantic data packet.

In effect, there are two types of content reference identifiers, a current and a linking content reference identifier. The semantic data packet includes information on whether the content reference identifier is a current or a linking content referencing identifier. A current content reference identifier refers directly to the content in which it is embedded, whereas a linking content reference identifier is one that refers to another programme, i.e. not the content in which it is embedded. FIG. 4 shows a table of various linking identifiers, and includes detail in relation to the type of information that would be carried in the semantic data packet. Reference to "A/V content" in this Figure refers to the audio and video content of the audio/video stream. The column headed "Group" refers to whether the content reference identifier relates to a group of programmes, or to a single programme.

As shown in FIG. 4, the type includes a trailer, a sibling, a parent, a recommendation, and an advertisement. When the type or label of the CRID included in the semantic data packet is the trailer of a program, then selection of a recording of the current content records the program; when the type is the sibling of the program, then selection of the recording of the current content records a next episode of the program; when the type is the parent of the program, then selection of the recording of the current content records all episodes of the program; when the type is the recommendation of the program, then selection of the current content records programs recommended by the broadcaster; and when the type is the advertisement then, in response to an interest by a user in a product or a service contained in the current content, information related to the product or the service are captured and provided to the user.

Certain content reference identifiers are time critical, and the semantic data packet includes information as to whether the content reference identifier(s) is (are) time critical. For example, current content reference identifiers are time critical since the receiver 22 must start recording at the correct time, whereas a linking identifier that refers to related programmes is not time critical. The receiver 22 processes this information so that it can efficiently identify time critical content reference identifiers so that action can be taken in a timely fashion.

The invention claimed is:

1. A method of creating an audio/video stream comprising combining a video component, an audio component, a content reference identifier (CRID), and a semantic data packet containing information on a relationship between the video component and the CRID, wherein the CRID uniquely identifies content for requesting the content using the CRID,
   wherein, when the relationship includes a label of a current content including the video component, then the CRID embedded in the audio/video stream is for the video component and is used to obtain enhanced information about the video component, and
   wherein, when the relationship includes a further label comprising a recommendation for a further content related to the current content including programs recommended by a broadcaster, then the CRID refers to the further content and is used for obtaining information about the further content, and
   selection of the current content records the programs recommended by the broadcaster without recording the current content.

2. The method according to claim 1, wherein said audio/video stream contains a second content reference identifier, and the semantic data packet contains information on both content reference identifiers.

3. The method according to claim 1, wherein said semantic data packet includes information as to whether at least one content reference identifier is time critical.

4. An apparatus for transmitting an audio/video stream comprising:
   a content stream input for receiving at least one of a video component and an audio component,
   a data stream input for receiving a content reference identifier (CRID) and a semantic data packet containing information on a relationship between the video component and the CRID,
   an audio/video stream generator for generating an audio/video stream from the content stream and the data stream, and
   a transmitter capable of transmitting the audio/video stream, wherein a current identifier of a current content related to a future program recommended by a broadcaster is related to the future program so that selecting recording of the current content will record the future program recommended by the broadcaster and will not record the current content when the relationship includes a further label for the future program related to the current content, so that the CRID refers to the future program and is used for obtaining information about the future program, wherein the CRID uniquely identifies content for requesting the content using the CRID,
   wherein, when the relationship includes a label of a current content including the video component, then the CRID embedded in the audio/video stream is for the video component and is used to obtain enhanced information about the video component.

5. The apparatus according to claim 4, wherein said transmitter transmits said audio/video stream via a wireless connection.

6. The apparatus according to claim 4, wherein said transmitter transmits said audio/video stream via a wired connection.

7. An apparatus for receiving an audio/video stream comprising an audio/video stream receiver, said audio/video stream comprising a video component, an audio component, a content reference identifier (CRID), and a semantic data packet containing information on a relationship between the video component and the CRID, and a stream splitter for splitting said audio/video stream into at least two of its constituent parts, wherein the CRID uniquely identifies content for requesting the content using the CRID,
   wherein, when the relationship includes a label of a current content including the video component, then the CRID embedded in the audio/video stream is for the video component and is used to obtain enhanced information about the video component, and
   wherein, when the relationship includes a further label comprising a recommendation for a further content related to the current content including programs recommended by a broadcaster, then the CRID refers to the further content and is used for obtaining information about the further content, and
   selection of the current content records the programs recommended by the broadcaster without recording the current content.

8. The apparatus according to claim 7, wherein said apparatus is a digital television receiver.

9. The method of claim 1, wherein when the audio/video stream includes a plurality of CRIDs, then selecting a recording function displays different programs linked to the current content and identified by the plurality of CRIDs for selection by a user.

10. The method of claim 1, wherein the audio/video stream comprises two different content reference identifiers for two programs that follow each other, the two programs adjoining each other and sharing a common content, the semantic data packet including capture information for capturing the common content if either of the programs is recorded.

11. The method of claim 1, wherein the audio/video stream comprises a hierarchical structure including program parts, the program parts being allocated individual identifiers to allow recording of each part in isolation, the audio/video stream further including an overall program identifier.

12. The apparatus of claim 4, wherein selecting the recording displays different programs linked to the current content for selection by a user.

13. The apparatus of claim 4, wherein the audio/video stream comprises two different content reference identifiers for two programs that follow each other, the two programs adjoining each other and sharing a common content, the semantic data packet including capture information for capturing the common content if either of the programs is recorded.

14. The apparatus of claim 4, wherein the audio/video stream comprises a hierarchical structure including program parts, the program parts being allocated individual identifiers to allow recording of each part in isolation, the audio/video stream further including an overall program identifier.

15. The apparatus of claim 7, wherein selecting the recording displays different programs linked to the current content for selection by a user.

16. The apparatus of claim 7, wherein the audio/video stream comprises two different content reference identifiers for two programs that follow each other, the two programs adjoining each other and sharing a common content, the semantic data packet including capture information for capturing the common content if either of the programs is recorded.

17. The apparatus of claim 7, wherein the audio/video stream comprises a hierarchical structure including program parts, the program parts being allocated individual identifiers to allow recording of each part in isolation, the audio/video stream further including an overall program identifier.

18. The method of claim 1, wherein the semantic data packet further contains a relationship between a product or a service featured in the current content and a related advertisement elsewhere, said related advertisement being captured when a user watching the current content indicates an interest in the product or the service.

19. The apparatus of claim 4, wherein the semantic data packet further contains a relationship between a product or a service featured in the current content and a related advertisement elsewhere, said related advertisement being captured when a user watching the current content indicates an interest in the product or the service.

20. The apparatus of claim 7, wherein the semantic data packet further contains a relationship between a product or a service featured in the current content and a related advertisement elsewhere, said related advertisement being captured when a user watching the current content indicates an interest in the product or the service.

21. The method of claim 1, wherein the further label is selected from a group comprising at least one of a trailer, a sibling, a parent, a recommendation, and an advertisement, and wherein when the further label is the trailer of a program, then selection of a recording of the current content records the program, wherein when the further label is the sibling of the program, then selection of the recording of the current content records a next episode of the program, wherein when the further label is the parent of the program, then selection of the recording of the current content records all episodes of the program, and wherein when the further label is the advertisement then, in response to an interest by a user in a product or a service contained in the current content, information related to the product or the service are captured and provided to the user.

22. The apparatus of claim 4, wherein the further label is selected from a group comprising at least one of a trailer, a sibling, a parent, a recommendation, and an advertisement, and wherein when the further label is the trailer of a program, then selection of a recording of the current content records the program, wherein when the further label is the sibling of the program, then selection of the recording of the current content records a next episode of the program, wherein when the further label is the parent of the program, then selection of the recording of the current content records all episodes of the program, and wherein when the further label is the advertisement then, in response to an interest by a user in a product or a service contained in the current content, information related to the product or the service are captured and provided to the user.

23. The apparatus of claim 7, wherein the further label is selected from a group comprising at least one of a trailer, a sibling, a parent, a recommendation, and an advertisement, and wherein when the further label is the trailer of a program, then selection of a recording of the current content records the program, wherein when the further label is the sibling of the program, then selection of the recording of the current content records a next episode of the program, wherein when the further label is the parent of the program, then selection of the recording of the current content records all episodes of the program, and wherein when the further label is the advertisement then, in response to an interest by a user in a product or a service contained in the current content, information related to the product or the service are captured and provided to the user.

* * * * *